United States Patent
Johnson et al.

(10) Patent No.: US 11,127,230 B2
(45) Date of Patent: Sep. 21, 2021

(54) SYSTEMS AND METHODS FOR CREATING KEY BACKUPS BY IDENTIFYING AND STORING UNIQUE KEY INFORMATION AND FOR REPLICATING UNIQUE KEYS FROM KEY BACKUPS

(71) Applicant: iKeyless, LLC, Louisville, KY (US)

(72) Inventors: Daniel Charles Johnson, Crestwood, KY (US); Michael Calvin McCoy, Palo Alto, CA (US); Dave King, Shelbyville, KY (US)

(73) Assignee: IKEYLESS, LLC, Louisville, KY (US)

( * ) Notice: Subject to any disclaimer, the term of this patent is extended or adjusted under 35 U.S.C. 154(b) by 144 days.

(21) Appl. No.: 16/153,602

(22) Filed: Oct. 5, 2018

(65) Prior Publication Data

US 2020/0013241 A1    Jan. 9, 2020

Related U.S. Application Data

(60) Provisional application No. 62/695,620, filed on Jul. 9, 2018.

(51) Int. Cl.
*G07C 5/08* (2006.01)
*B60R 25/24* (2013.01)
*H04L 9/08* (2006.01)
*B60R 25/20* (2013.01)

(52) U.S. Cl.
CPC ............ *G07C 5/085* (2013.01); *B60R 25/209* (2013.01); *B60R 25/248* (2013.01); *H04L 9/0891* (2013.01); *H04L 9/0894* (2013.01); *B60R 2325/108* (2013.01)

(58) Field of Classification Search
CPC ..... G07C 5/085; B60R 25/209; B60R 25/248; B60R 2325/108; H04L 9/0891; H04L 9/0894
See application file for complete search history.

(56) References Cited

U.S. PATENT DOCUMENTS

| | | | |
|---|---|---|---|
| 5,874,785 A * | 2/1999 | Liu | B60R 25/04 307/10.5 |
| 6,501,369 B1* | 12/2002 | Treharne | B60R 25/24 307/10.5 |
| 8,841,987 B1* | 9/2014 | Stanfield | G07C 9/00857 340/5.61 |
| 9,286,743 B2* | 3/2016 | Lopez | G07C 9/00571 |
| 9,306,735 B2* | 4/2016 | Kawamura | H04L 9/08 |
| 9,509,496 B2* | 11/2016 | Kawamura | G07C 9/00817 |
| 10,030,590 B2* | 7/2018 | Hagedorn Maillard | B60R 25/20 |
| 2016/0012653 A1* | 1/2016 | Soroko | G07C 5/0808 340/5.61 |

* cited by examiner

*Primary Examiner* — Thomas D Alunkal
(74) *Attorney, Agent, or Firm* — Duncan Galloway Egan Greenwald PLLC; Kevin T. Duncan (57) ABSTRACT

The present invention provides a service and supporting technology for backing up and restoring or replacing OEM vehicle keys. The system works by storing a copy of the data from an OEM key along with other information necessary to replace the OEM key in a key bank. The data collected is processed and stored such that a customer can order a universal replacement from the key bank programmed with the stored data to emulate the prior paired OEM key. No further pairing or programming is required by the customer.

21 Claims, 7 Drawing Sheets

SYSTEMS AND METHODS FOR CREATING KEY BACKUPS BY IDENTIFYING AND STORING UNIQUE KEY INFORMATION AND FOR REPLICATING UNIQUE KEYS FROM KEY BACKUPS

CROSS-REFERENCE TO RELATED APPLICATION

The present application claims benefit of priority to U.S. Provisional Pat. Application Ser. No. 62/695,620, filed Jul. 9, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which is hereby incorporated by reference herein in its entirety.

FIELD OF INVENTION

The present invention generally relates to the field of replicating or copying keys. More specifically, the present invention relates to storing a copy of information relating to unique and/or encrypted data related to a vehicle key and for creating a copy of the vehicle key using the stored information such that the duplicate key can be used on a vehicle without the use of a locksmith or other specialized technician. The present invention identifies and stores unique information associated with a vehicle key including information relating to encryption codes and transponder information in a central server and uses the stored information to create an exact copy of the vehicle key.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

Contemporary remote keyless entry systems are designed to be easy to use and secure from attackers. When a user presses a button on his or her keyless remote, an internal microprocessor interprets the request and generates a unique packet of binary data. This packet may contain a unique serial number of the remote, an authentication string, function code, and various checksums. This data packet is then transmitted by the remote via an ultra high frequency radio signal to the vehicle. The user's vehicle can then process the data verifying the remote is authorized and perform the requested action (ex: unlocking a door).

The transmitted radio signal could be monitored by possible attackers so the authentication string is important in maintaining the security of the vehicle. The authentication string often changes with each button press in what is known as a "rolling code". This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Additionally, Starting in the early 1990s, car keys began incorporating transponder technology. Transponders are small plastic or glass inserts that are self-contained devices which supplemented the security of the cut key blade. Transponders require no battery and are powered by a low frequency radio signal delivered from a loop of wire around the ignition coil. When a driver starts his or her car, the key blade activates the ignition and the car simultaneously "reads" the transponder via the wire loop to verify the key was authorized to start the car. If the transponder does not "respond" with a valid code (e.g., in the case of hot-wiring a car), the car will shut itself off after a few seconds from starting.

Security transponder evolution has mirrored that of remote keyless entry systems with the first generation being simple, insecure devices that transmitted a fixed value when interrogated by the ignition coil. Much like remote keyless entry, the communication signals can be easily monitored by an attacker with legally available tools. To avoid replay attacks, transponders quickly moved to more complex encryption, such as HITAG and AES, as well as the use of rolling codes. Transponders are now typically highly secure devices capable of bidirectional communication with the vehicle. With the ability for the car to send data to a transponder, some vehicle keys have the ability to store hundreds of bytes of information about the key and vehicle. This information may comprise secret encryption keys and comfort features such as the last radio station used or electronic seat position.

In addition to incorporating transponders with the key blade, remote keyless entry ("RKE") systems and key fobs now incorporate the transponder functionality with remote keyless entry microprocessors on the key blade. The combination of transponder, remote keyless entry microprocessor and system, and key blade forms a combination key where the keyless remote, key blade, and security transponder are packed together into a single device. These devices are both cheaper to produce than keys and remotes and are more secure. The remote keyless entry portion and transponder portion of the key can share information providing for the transponder to receive rolling code and encryption key updates from the vehicle. Using a combination key with the transponder and remote keyless entry system in communication with one another, the rolling code protocols and encryption techniques may become very advanced and unbreakable to all but the most dedicated attacker.

Due to this high margin of security, these devices are not something the lay person could replace or add to their vehicle easily. To pair such a "combo" key to a car requires both a locksmith to cut the blade and specialized programming tools, unavailable to the public, to pair the transponder and remote with the vehicle. Often the vehicle dealer is the only source for keys and pairing tools which leads to high prices for replacement keys/remotes.

Given the complexity of the RKE systems in vehicles, automotive key/remote duplication is a complex and expensive process. Car owners may have a difficult time finding replacement keys and remotes, especially for older vehicles that may no longer be supported by the original manufacturer or automotive dealership.

Once a vehicle owner has located a source for a new RKE device, they must purchase the device and then pay for a locksmith to "pair" the product to the vehicle. This "pairing" process usually involves the use of an expensive dealer owned programming tool or an aftermarket programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key or remote with the vehicle. Once generated, these authentication codes are static. If the authentication codes were captured during the pairing process, they would remain valid for later usage. Generally, this conversation between the tool and the vehicle includes a security transponder, the vehicle electronic control unit ("ECU") or body control module ("BCM"), and the RKE device. If this process is not executed properly or a programming fault occurs it is possible to leave the car in a "bricked" state where the vehicle will not start or respond properly to the RKE device. It can be a very expensive process to reset the ECU or body control module of a vehicle.

The problem described above can become even more complicated if the vehicle owner loses their RKE device while traveling to locations where they do not have access to a dealership that can support their vehicle. In this instance, the vehicle owner may be faced with significant towing charges and delays while they wait to have their vehicle key replaced by an authorized dealer. These are only the basic challenges associated with replacing keys and remotes. The key generation and replacement problem is even more complex when viewed from a locksmith perspective.

A wide range of tools and software is required to pair a RKE device to a vehicle. A typical suite of tools may include a very expensive programming tool, software modules to cover various vehicle brands and model years, and a separate OBD port module that performs all or part of the pairing process. Tooling and software costs alone can easily exceed $20,000 if the locksmith wants to service a broad range of vehicles.

In addition to the programming tools and software, locksmiths must provide key blades that come in many types and shapes depending on the manufacturer's requirements for the ignition cylinder. Modern blades are typically milled as opposed to traditional grinding wheel approaches. These special cutting tools are also very expensive.

Once the blade issues are addressed, the locksmith may also be required to purchase PIN codes and wait long periods of time to activate the PIN codes during the pairing process. To recover labor and equipment costs locksmiths typically charge their customers significant fees for their services.

From a customer perspective, other issues may occur that may cause the pairing process to become even more complex. In many cases, when performing the pairing process, the customer must have all their keys and remotes available for the locksmith at the time a key is to be paired to the vehicle. The maximum number of keys that can be paired varies between vehicle makes and models but is normally between 4-6 keys. Some vehicles have "master" and "valet" keys. Valet keys cannot normally be used when pairing new keys to the vehicle so, if the master keys have been lost, a new master key must be first be made. Additionally, some customers may need to have their keys or remotes paired to the vehicle again after a vehicle service or repair if the battery was removed from the vehicle for an extended period.

These issues compound to make for a very challenging and negative experience for the customer when replacing or copying an OEM vehicle key. Customers are forced to source replacement keys from dealers or locksmiths.

One possible solution to some of these issues is the use of a "virtual key" hosted entirely on a smartphone. Many virtual key devices bypass traditional immobilizers and security systems. Some even communicate directly with the BCM or ECU. These approaches may be dependent on networks that lack appropriate levels of security thereby putting the vehicle at risk. Additionally, car companies are constantly designing new systems that are unique to their vehicles and do not rely on traditional RKE solutions. In these cases, the customer is forced to purchase expensive replacement keys/remotes directly from the OEM supplier or dealerships. Smart phone related solutions also rely on phone apps and hardware that may have failure modes due to limited network access at critical times. Battery limitations may also be an issue for smartphone hosted virtual keys.

What is needed is a system for storing OEM key information such that a customer can order a replacement OEM key without having to pair the key with the vehicle. What is needed is a service that ensures that a customer can obtain a new key or remote for their vehicle without the burden of locating a replacement product, locating a suitable locksmith, and scheduling a time to have the product paired with the vehicle.

SUMMARY OF THE INVENTION

The present invention provides systems and methods for reproducing vehicle OEM keys from stored data relating to an original vehicle OEM key. The present invention can reproduce a key from pairing data captured when a key is first paired to a vehicle. This eliminates the need for a "duplicate" key to be paired with the vehicle by a locksmith or dealer. The present invention provides key and/or remote insurance or backup services at the time a key and/or remote is purchased.

When the original key is paired with the vehicle, pairing information obtained from monitoring the key, the ignition coil and transponder, and the vehicle's OBD port along with the vehicle's VIN, customer information, and a unique customer identification number are stored in a secure, encrypted key bank. Encryption is used to secure all data that is captured during the initial pairing session. All information stored in the key bank database is encrypted and may also be secured with a hardware security chip.

Using the key bank, replacement keys and/or remotes can be programmed using the stored information that was obtained at the time of the original pairing. The replacement keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014, also published as U.S. 2014/0218165, Johnson et al., which is incorporated by reference herein in its entirety. The replacement keys may also replicate transponder functionality by emulating the OEM transponder or by incorporating a physical transponder device. When a replacement key is received by a user or customer a smartphone may be used to authenticate the replacement key.

In a first embodiment the present invention provides a method for capturing and storing vehicle key information used for replacing vehicle keys, the method comprising: installing an on-board diagnostic ("OBD") port monitor in an OBD port of a vehicle and an ignition coil monitor on an ignition coil of the vehicle; starting and stopping the vehicle a pre-determined number of times using an original equipment manufacturer ("OEM") key that was previously paired with the vehicle; capturing a set of vehicle information associated with the vehicle and a set key information associated with the OEM key in part by monitoring the OBD port by the OBD port monitor and monitoring the ignition coil by the ignition coil monitor; analyzing the set of vehicle information and the set of key information to identify a set of unique information associated with the vehicle and the OEM key; and storing the set of unique information, the set of vehicle information, and the set of key information in an encrypted data store.

The method of the first embodiment may further comprise pairing a replacement key with the vehicle; capturing a set of pairing information associated with the pairing of the replacement key with the vehicle by the OBD port monitor and the ignition coil monitor; analyzing the set of pairing information to identify the set of unique information; and storing the set of pairing information in the encrypted data store. The set of unique information may comprise transponder information. The method may further comprise transmitting the set of vehicle information and the set of key information to a remote server for analysis. The method may further comprise capturing a set of OBD transaction information by the OBD port monitor. The analyzing may further comprise analyzing the set of OBD transaction information to identify the set of unique information. The method may further comprise: capturing a set of owner information associated with an owner of the vehicle; associating the set of owner information with the set of vehicle information, the set of key information, and the set of unique information; and storing the set of owner information in the encrypted data store. The method may further comprise programming a unique identification card with the set of owner information and the set of unique information. The method may further comprise: receiving and processing a request for a replacement key from an owner associated with the set of unique information; programming and configuring the replacement key based on the set of unique information stored in the encrypted data store; and sending the replacement key to the owner, the replacement key requiring no additional pairing processes to function with the vehicle. The programming and configuring may further comprise: cutting a key blade of the replacement key based on the set of key information; programming the replacement key based in part on a vehicle identification code; emulating, in the replacement key, a transponder of the vehicle based on the set of unique information; updating a memory in the replacement key based on a set of unique parameters associated with the vehicle and the OEM key; and programming a set of additional features in the replacement key. The method may further comprise activating the replacement key with a mobile device. The capturing the set of vehicle information may further comprise capturing a vehicle identification number ("VIN").

In a second embodiment, the present invention provides a system for capturing and storing vehicle key information for programming and configuring replacement vehicle keys, the system comprising: a server having a processor and a memory and comprising an encrypted data storage; an on-board diagnostic ("OBD") port monitor; an ignition coil monitor; a base station in communication with the ignition coil monitor and the OBD port monitor; the base station adapted to monitor and capture, by the OBD port monitor and the ignition coil monitor, communications signals between a vehicle key comprising a transponder, a remote keyless entry system having a processor and a memory, and a key blade, and a vehicle comprising a remote keyless entry system, an engine control unit ("ECU"), an ignition coil, and OBD port connected to the ECU; wherein the communications signals are generated when the vehicle key is operated to cause the vehicle to perform a function; the base station further adapted to transmit to the server the captured communications signals; and the server adapted to identify a set of unique information based on the set of captured communications, and to store the set of unique information in the encrypted data store.

The system of the second embodiment may further comprise: a key configuration device; the server further configured to transmit to the key configuration device the set of unique information based on a received replacement key request; and the key configuration device adapted to receive the set of unique information from the server and configure a replacement key based on the set of unique information. The OBD port monitor may be connected to the vehicle OBD port and the ignition coil monitor is connected to the vehicle ignition coil. The communication signals may comprise: a first data stream comprising information obtained by monitoring a first set of communications between the transponder of the key and the ignition coil by the ignition coil monitor; and a second data stream comprising information obtained by monitoring a set of ECU information in the vehicle ECU by the OBD port monitor. The system may further comprise a card programmer adapted to program a unique identification card with the set of unique information and an associated set of owner information. The server may further be adapted to receive an activation signal from a mobile device and transmit to the mobile device an authentication signal, the authentication signal adapted to enable functionality on the replacement key. The system may further comprise an OBD dongle adapted to connect to the vehicle OBD port, receive the authentication signal from the mobile device, and update the replacement key based in part on the activation signal and a set of updated vehicle information.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

While remote-only devices are still sold with new cars, the automotive industry has been moving toward more highly integrated remote and key blade combination devices. These remote head keys are often much more advanced than a typical key blade and transponder device and have the ability to store information about the car.

The URHK is designed to cover the largest range of compatible remotes or stock keeping units ("SKUs") representing vehicle makes and models, as possible. The URHK device emulates the three main features of a modern combination remote head key: the cut key blade, the remote keyless entry radio frequency ("RF") transmitter, and the low frequency ("LF") security transponder. The URHK supports a large range of interchangeable key blades that covers a plurality of blade sizes, shapes, and bitting patterns. The main body of the URHK remote has a mechanism to secure a key blade insert for cutting and normal usage. The URHK RF transmitter is frequency agile. The transmitter is configurable between AM and FM, and also supports various encoding schemes (Manchester, Pulse Width, etc.). The URHK security transponder is able to emulate several different types of OEM transponders. The tight coupling of a typical remote head key to the car means the URHK can be leveraged to create a unique key back-up service, i.e. a Key Bank or "KeyBank". The Key Bank may also be referred to more generally as a key bank. The Key Bank service and URHK device may be provided by iKeyless, Inc. to provide customers or users with a way to back up and replace vehicle keys.

The URHK can serve as a replacement for, or as an addition to, an OEM provided remote head key. The programming operation for the URHK is similar to the user experience of programming an universal remote controls for televisions. Beyond the RKE required communication means, the URHK may also contain additional communication channels to support Near Field Communications ("NFC") and Bluetooth Low Energy transceivers ("BLE"). This allows for non-contact programming of the URHK through a mobile device. This interface can also be used to activate unique smart key functions or additional Key Bank services.

The Key Bank service can be used with OEM remote head keys or URHK devices. A user with a compatible vehicle can enroll their keys in the Key Bank service that will securely store a copy of critical remote configuration information. If the user then loses their key, they can contact the Key Bank service and request a replacement. The replacement key will use the stored remote information to give them an exact copy of their remote that works right out of the package.

The replacement key of the present invention works without requiring a "pairing" process. A pairing process for a vehicle key is a multi-step process that typically involves the user performing multiple operations with either the key or vehicle or both that may include opening/closing doors, opening/closing windows, pressing buttons on the vehicle key, operating controls in the vehicle, starting and turning off the vehicle, and also includes authenticating the vehicle key with the vehicle by synchronizing encryption information which may include the entry of a unique PIN. Additionally pairing requires the use of specialized tools that must be connected to either the key, the vehicle, or both and that may only be used by authorized vehicle dealers or locksmiths.

Figure 1:
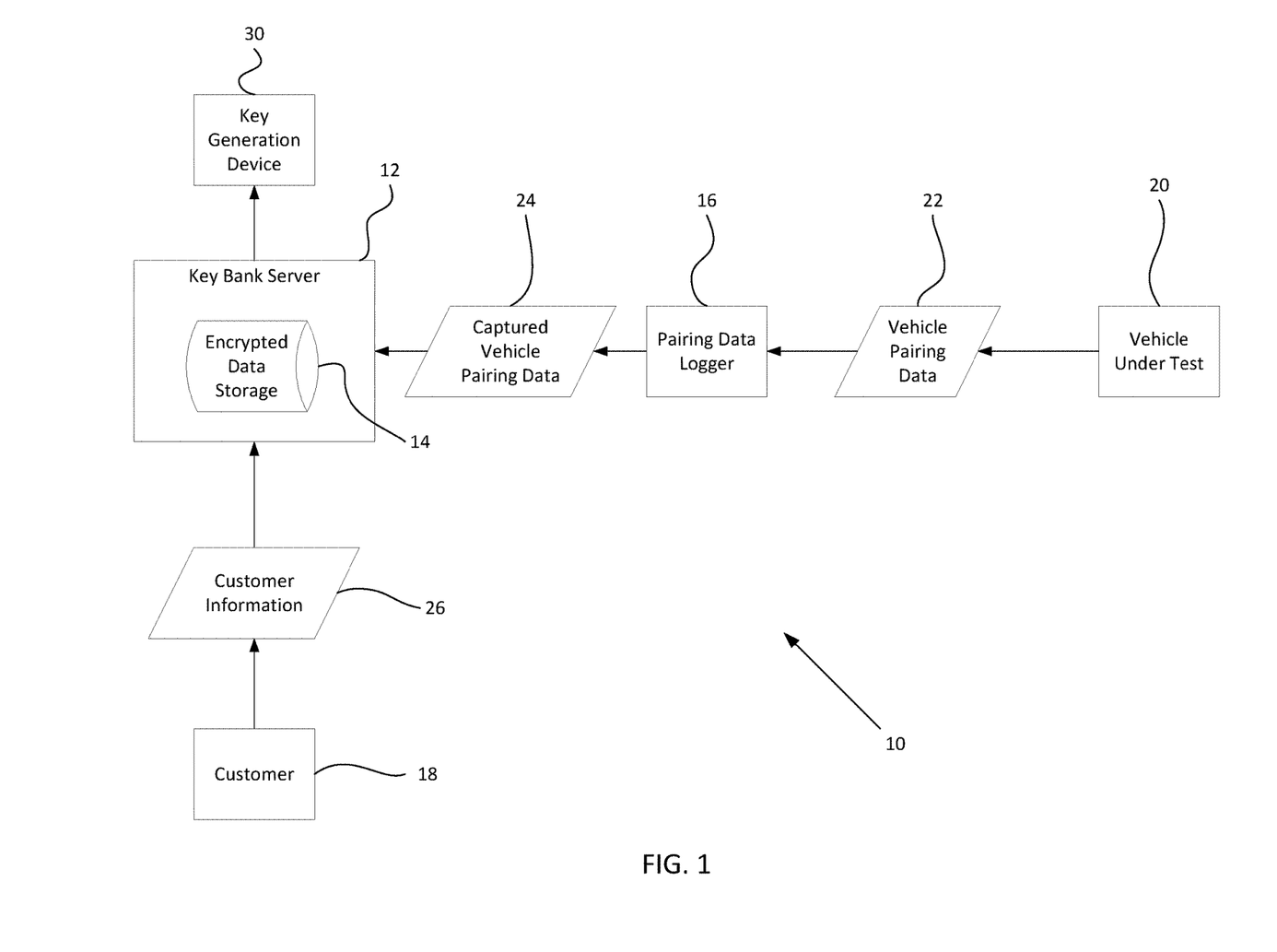
FIG. 1 provides a simplified block-diagram of one embodiment of the system for capturing and storing pairing data when a key is paired with a vehicle.

With reference to FIG. 1, a simplified block-diagram of one embodiment of the system 10 for capturing and storing pairing data when a key is paired with a vehicle is provided. The system 10 is adapted to capture and store vehicle key information to be used in replacing vehicle keys. The system 10 comprises a Key Bank server 12 having an encrypted data storage 14, a pairing data logger 16, a customer 18, a vehicle under test 20, and a key generation device 30. The system 10 is used to capture unique information about a vehicle and a vehicle key, which may be either an OEM key or a URHK, and store the unique information in the encrypted data storage 14 after processing at the Key Bank server 12. In operation, vehicle pairing data 22 is either passed to or captured by the pairing data logger 16 from the vehicle under test 20. This vehicle pairing data 22 comprises transponder communication information and information collected by monitoring the vehicle under test 20 OBD port. The vehicle pairing data 22 is then securely transmitted by the pairing data logger 16 as captured vehicle pairing data 24 to the Key Bank server 12.

The Key Bank server 12 processes the captured vehicle pairing data 24 to identify a set of unique information required to create a replacement vehicle key. This process involves the analysis of a plurality of data streams in the captured vehicle pairing data 24 including information captured from the vehicle ignition coil and information associated with the vehicle ECU captured through the OBD port. The set of unique information includes transponder information associated with the key being analyzed, vehicle security information, i.e., rolling code encryption keys and states, a unique PIN code used in a pairing process, and the vehicle under test 20 VIN code. The set of unique information is supplemented with a set of customer information 26 and is stored in the encrypted data storage 14. The Key Bank server 12 transmits the information stored in the encrypted data storage 14 to the key generation device 30 when it receives an authenticated signal or request for a replacement vehicle key from the customer 18.

The key generation device 30 uses the set of unique information to program and configure a replacement key. The programming and configuration involves configuration, programming, or emulation of a transponder in the replacement key. The programming and configuration also involves setting a number of memory registers to specific values stored in the set of unique information. The replacement key is also programmed to execute the functions of the original key from which the unique information was obtained, and may also be programmed to execute additional, unique features. A key blade in the replacement key is also cut by the key generation device 30 such that they replacement key will work in the original vehicle under test 20 key barrel.

The expense and hassle to the end user of losing a remote head key is alleviated by using the replacement key generated by the key generation device 30, which will typically be a URHK. Typically, when replacing a lost key the user must get a totally new key to replace the lost one and this replacement must be provided by a locksmith or vehicle dealer. Even knowing all the information that was stored within a key, it is currently impossible to create an exact replacement copy of the lost key. The replacement key URHK generated by the system 10 can overcome this problem as it can behave as an "exact copy" of any key SKU it can emulate.

To use the Key Bank 12 and Key Bank service provided by the system 10, the user must enroll their car remote head key in the Key Bank 12 before needing a replacement. Enrolling the remote head key stores necessary information "on file" so that it may be later used by the key generation device 30 to create a replacement UHRK. If the user had an OEM remote, the data necessary to create a replacement URHK, the set of unique data, must be collected at the time the original OEM key is paired to the vehicle or at a later time by using a special monitoring tool, which may be a separate device or may be incorporated into the pairing data logger 16, to collect the information during normal operation of the vehicle. If the user already has a URHK the required information may be retrieved directly via the transponder interface in the URHK using a reader tool, which may be a separate device or may be incorporated into the pairing data logger 16, or by a NFC/BTLE interface in the URHK using a mobile device or PC.

Once the required set of unique key information such as the key's hardware ID and secret key are obtained, it is uploaded to the Key Bank server 12 where it can be stored securely in the encrypted data store 14 until the user needs a replacement key. When the replacement key is needed, the user can request a replacement remote from the Key Bank service. The service will use the stored information gained from the original OEM key to program a URHK as an exact replica of the original.

The remote keyless entry portion of the replacement UHRK will function similarly to the previously described URHK device. The contents of the transmitted OEM RKE signal by the URHK will be replicated exactly along with its electrical characteristics. The URHK is able to adjust its transmission frequency, modulation type (ASK or FSK), and data rates depending on the remote it is emulating. The security transponder portion of the replacement URHK fully emulates several existing transponders protocols. These protocols describe how information is read and written by the vehicle to the transponder device. While the physical characteristics (transmit frequencies and data rates) of the transmission will not differ from protocol to protocol, the encryption and communications coding will. In addition to emulating the standard transponders interface, URHK specific transponder behavior will be included. The transponder being a bidirectional communications interface allows for a great deal of diagnostic and configuration options. The SKU selection process can be completed via the transponder interface with the key generation device 30, the pairing data logger 16, or by another stand-alone tool that writes the selected remote code to a location in transponder memory. The same tool can also read out usage statistics about the remote and any secret information typically known only to the vehicle and transponder. This information can be used in the Key Banking process.

The authenticating data packet will, similarly, be uniquely generated for each button press using the proper rolling code and encryption schemes. The key advantage is replicating the OEM remote and immobilizer transponder interaction with the vehicle.

When the user receives the remote, they will be able to immediately start their vehicle and use its remote features. No key pairing process will be required. The user will be able to replace the remote as many times as they want as long as they own the car. The system 10 may also be used to order a complete set of keys when purchasing a used vehicle assuming it had previously been enrolled in the Key Bank service.

Figure 2:
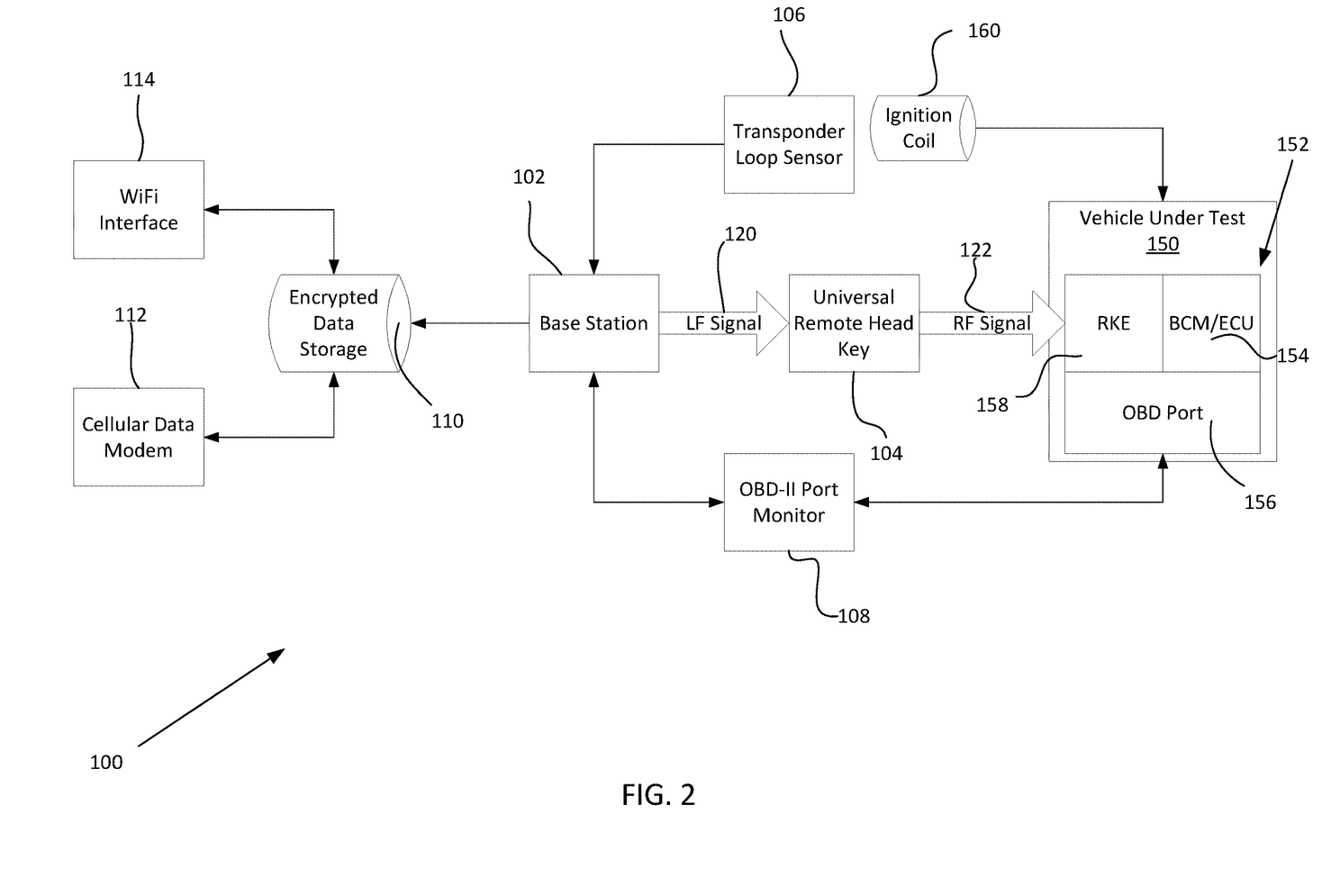
FIG. 2 provides a block-diagram schematic view of one embodiment of the system for capturing and storing pairing data when a key is paired with a vehicle.

With reference to FIG. 2, a block-diagram schematic view of one embodiment of a system 100 for capturing and storing pairing data when a key is paired with a vehicle is provided. The system 100 comprises a base station 102 that may comprise or be connected to an ignition coil monitor or transponder loop sensor 106 and an OBD port monitor 108. The system 100 further comprises an encrypted data storage 110 that may be connected to local or wide area networks by a Wi-Fi interface 114, or by a cellular data modem 112. In operation, the base station 102 may monitor and capture information from the vehicle under test 150 by the OBD port monitor 108 and the transponder loop sensor 106.

The transponder loop sensor 106 is installed on the ignition coil 160 of the vehicle under test 150 and the OBD port monitor 108 is connected to the OBD port 156 of the vehicle under test. The OBD port 156 may be an OBD II port and the OBD port monitor 108 may be adapted to connect to a standard OBD II connection port. The transponder loop sensor 106 monitors communications and data that passes between the URHK 104 and the ignition coil 160. The transponder loop sensor 106 may also be used to monitor communications when an OEM key is used. The OBD port monitor 108 may gather information from vehicle electrical system components 152 including the BCM/ECU 154 and the RKE system 158. The base station 102 may also communicate directly with the URHK 104 by a LF signal 120 to send and/or receive data from the URHK 104. This communication may include monitoring RF signals 122 sent by the URHK 104 to the vehicle under test 150 RKE system 158.

In some cases where the RKE functions may not be accessible via the OBD port, low level data analysis of CAN and LIN bus transactions may be required. Typically these busses are not available for monitoring or communications outside of what is provided through the OBD port. However, the present invention may authenticate to these local busses, such as the CAN and LIN busses, to "go below" the standard OBD protocol to obtain the necessary information about the vehicle, key, and communications between the vehicle and key.

Figure 7:
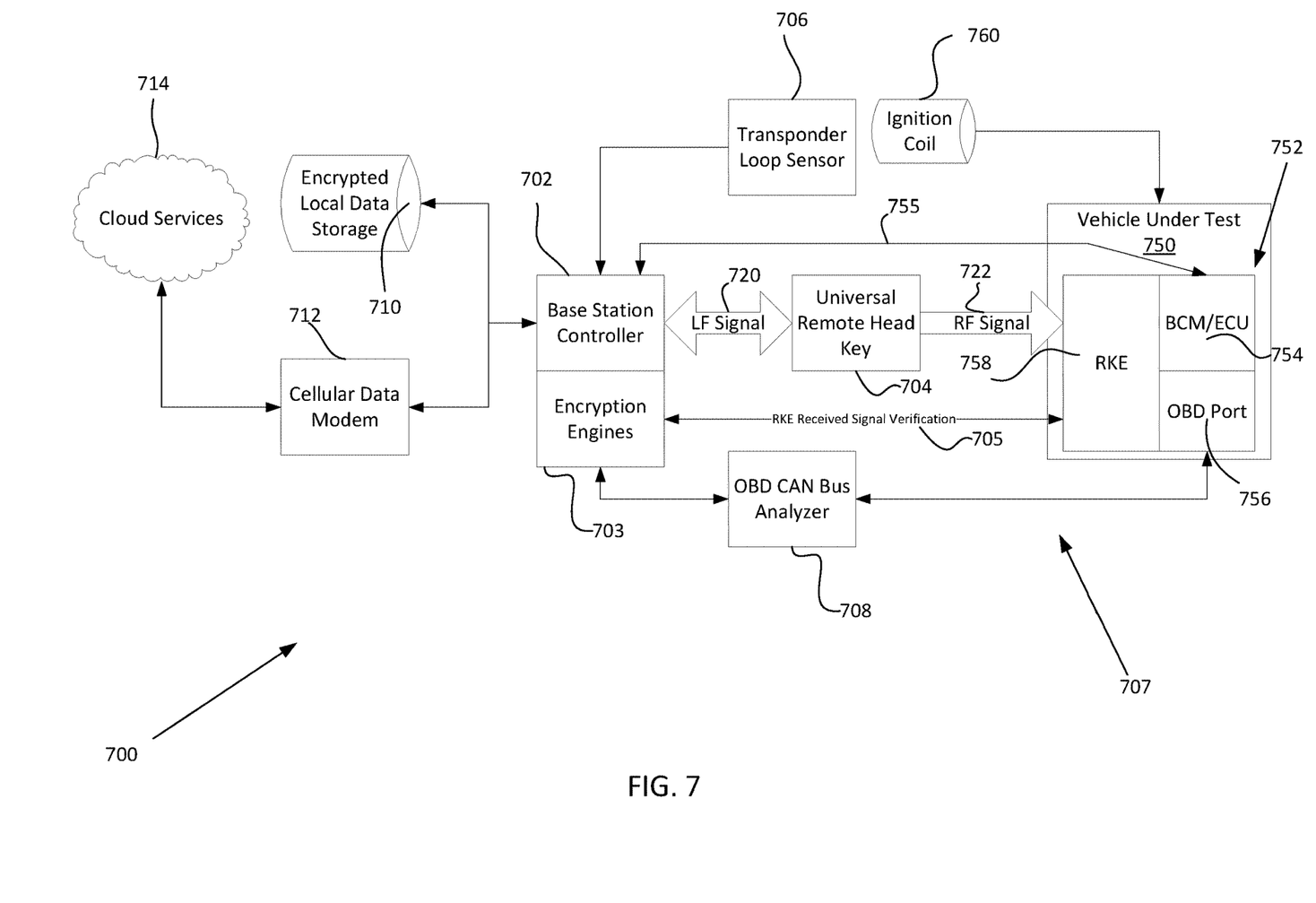
FIG. 7 provides a block-diagram schematic view of one embodiment of the system for capturing and storing pairing data when a key is paired with a vehicle.

With reference to FIG. 7, a block-diagram schematic view of one embodiment of a system 700 for capturing and storing pairing data when a key is paired with a vehicle is provided.

The system 700 comprises a base station 702 that may comprise or be connected to an ignition coil monitor or transponder loop sensor 706 and an OBD port monitor 708. Additionally, the base station controller 702 comprises a set of encryption engines 703 for encrypting/decrypting data in the encrypted local data storage 710 and for encrypting/decrypting communications between the base station controller 702, URHK 704, and vehicle under test 750. This may include extracting encrypted or encoded information from the BCM/ECU 754 of the vehicle and also may include intercepting and interpreting communications over a plurality of communications pathways between the base station controller 702, URHK 704 and BCM/ECU 754. The system 700 further comprises an encrypted local data storage 710, and is connected to local or wide area networks, such as cloud services 714, or by a cellular data modem 712. The could services 714 may provide storage, processing support such as encryption and decryption, profiles, and updates for the base station controller 702. In operation, the base station 702 may monitor and capture information from the vehicle under test 750 by the OBD port monitor 708 and the transponder loop sensor 706. These two communications pathways form part of a feedback loop. The system 700 may be optimized using a feedback loop to send signals to the vehicle 750 and key 704 to see and interpret the behavior of one or both devices. This behavior and the communications signals may be interpreted by the base station controller 702 and encrypted/decrypted by the encryption engines 703 as necessary. These active signal paths 707 include the signals between the OBD CAN bus analyzer 708 and OBD port 756, between the UHRK 704 and RKE system 758 (RF signal 722 and RKE received signal verification 705), and the transponder loop sensor 706 and ignition coil 760. These pathways may be uni- or bi-directional. The feedback pathway 755 between the base station controller 702 and the BCM/ECU 754, for example, is bi-directional. Additionally, the LF signal pathway 720, the RKE received signal verification pathway 705, the communications between the encryption engines 703 and OBD CAN bus analyzer 708, the communications between the OBD CAN bus analyzer 708 and the OBD port 756, the communications between the cellular modem 712 and both the cloud services 714 and base station controller 702, and the communications between the encrypted local data storage 710 and base station controller 702 may all be bi-directional. Uni-directional communications paths may include the RF signal 722 from the URHK 704 to the RKE 758 of the vehicle 750.

As in FIG. 2, in the system 700 of FIG. 7 the transponder loop sensor 706 is installed on the ignition coil 760 of the vehicle under test 750 and the OBD CAN bus analyzer 708 is connected to the OBD port 756 of the vehicle under test. The OBD port 756 may be an OBD II port and the OBD port monitor 708 may be adapted to connect to a standard OBD II connection port. The transponder loop sensor 706 monitors communications and data that passes between the URHK 704 and the ignition coil 760. The transponder loop sensor 706 may also be used to monitor communications when an OEM key is used. The OBD port monitor 708 may gather information from vehicle electrical system components 752 including the BCM/ECU 754 and the RKE system 758. The base station 702 may also communicate directly with the URHK 704 by a LF signal 720 to send and/or receive data from the URHK 704. This communication may include monitoring RF signals 722 sent by the URHK 704 to the vehicle under test 750 RKE system 758.

Additionally, with both the systems 700 in FIGS. 7 and 100 in FIG. 2 all transactions between the BCM/ECU and the base station controller may be logged. There may also be further communications from or between the BCM/ECU and a media system in the vehicle. In modern vehicles, the media system is typically integrated with some or all of the system security functions and some basic vehicle functions. This offloads functionality and actions typically performed or handled by the BCM/ECU. The base station controller, e.g., controller 700, may log and/or intercept these communications in addition to communications to/from the BCM/ECU. The URHK 704 (or URHK 104) is also intelligent. The URHK 704 may comprise one or more processors and one or more memories including RAM and ROM. The URHK 704 may also be included in the data collection process and may log and collect data that is transferred between the URHK 704 and the vehicle 750.

Figure 3:
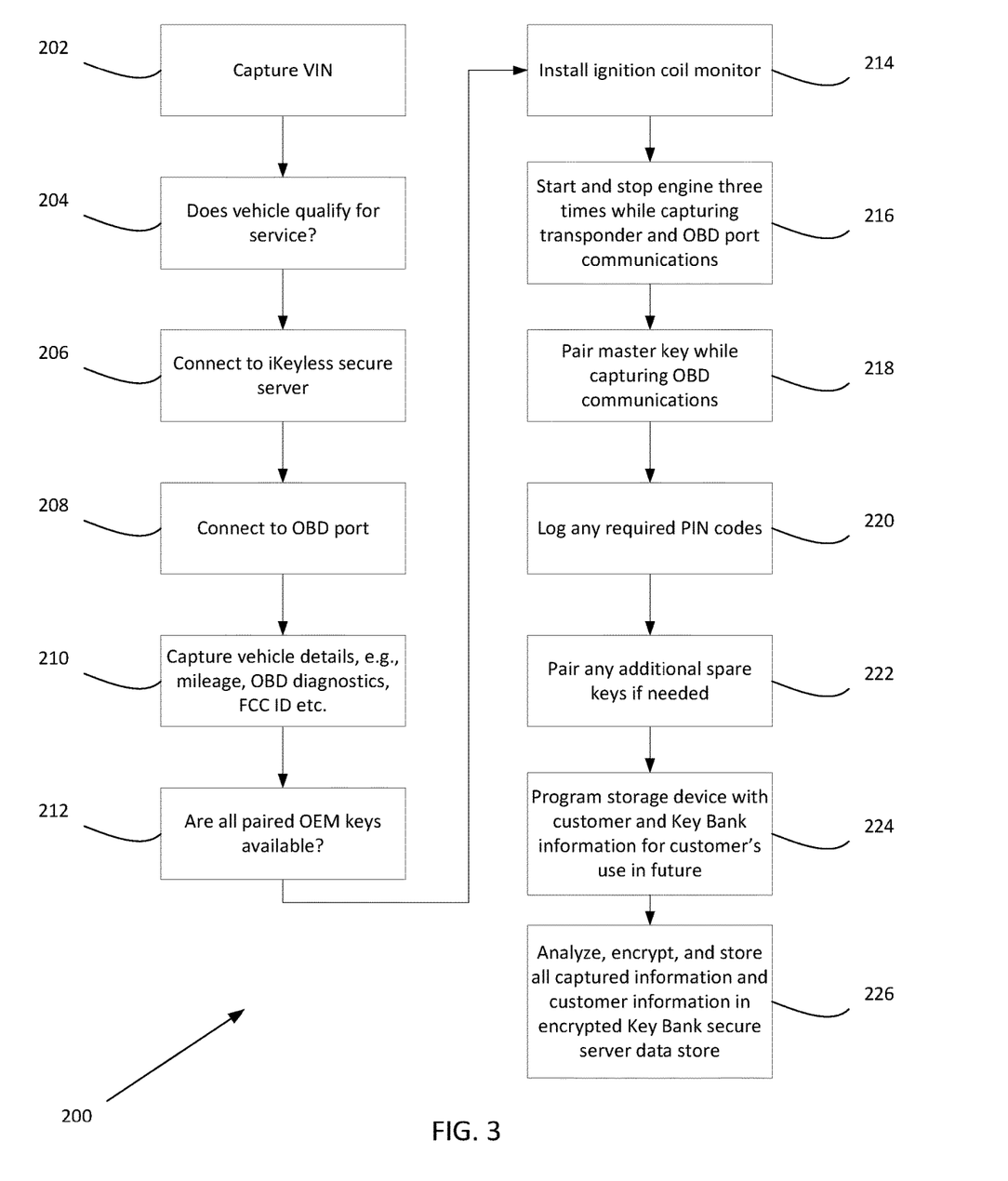
FIG. 3 provides a flowchart illustrating the general process of capturing vehicle data according to one embodiment of the invention.

With reference to FIG. 3, a flowchart 200 illustrating the general process of capturing vehicle data for the Key Bank service according to one embodiment of the invention. The process begins with step 202 where the VIN of a vehicle is captured by a device such as the base station 102 or pairing data logger 16. The VIN may be captured by taking a picture of the VIN barcode located on the vehicle, by taking a picture of the VIN itself, or by entering the VIN manually. The VIN is then evaluated at step 204 to determine if the vehicle make and model are among the SKUs that may be used with the Key Bank service. If the vehicle is eligible, at step 206 a connection is made to a secure server which may be operated by iKeyless, Inc.

After the connection is made with the secure server, at step 208 a connection to a vehicle OBD port is made. Once the connection is made, at step 210 vehicle data is captured. This vehicle data includes vehicle details and information such as mileage, OBD diagnostic information, Federal Communications Commission ("FCC") ID, BCM status and information, and other information that may be provided by the vehicle ECU. It is then determined at step 212 if any or all of the vehicle OEM keys are available. If all keys are available, in particular any OEM master keys and other keys such as valet keys, then the process may continue. If the keys are not available, a URHK may be used to pair with the vehicle. An alternative method may be used to gather the necessary vehicle information, key information, and other unique information required to make a key backup for the Key Bank and Key Bank service if the OEM keys are not available.

If the vehicle OEM keys are available, at step 214 an ignition coil monitor or transponder loop sensor is installed on the vehicle. The next step 216 involves starting and stopping the engine three times while capturing transponder information at the ignition coil monitor and capturing OBD port communications and vehicle information at the OBD port monitor. The master key is then paired with the vehicle at step 218 while capturing OBD port communications at the OBD port monitor. Any PIN codes or special codes required to complete the key pairing process are recorded and stored at step 220. Any additional keys, spare keys, valet keys, or other keys may be paired at step 222. At this time additional vehicle and key information may be captured.

After all information has been captured, a unique identification card or storage device, such as a radio frequency identification ("RFID") or NFC card, may be programmed or configured with customer information and with unique Key Bank information for the customer's use in the future at step 224. The unique Key Bank information includes, for example, a unique identifier for the customer, vehicle information such as the VIN or SKU, and information about the number and type of keys enrolled in the Key Bank service.

The next step 226 involves analyzing, encrypting and storing all captured information and customer information in the encrypted Key Bank secure server data store. The captured data including any captured datastreams from the ignition coil monitor and OBD port monitor are analyzed to identify and extract information necessary to create a replacement URHK. All information in the "conversation" between the vehicle and the key used in the process 200 is captured and stored. The identified and extracted information may include transponder information, key information, and vehicle information necessary. All captured and analyzed information is associated with customer information and a unique identifier, e.g., a customer or vehicle owner identification number, and then encrypted and stored in an encrypted data store.

Figure 4:
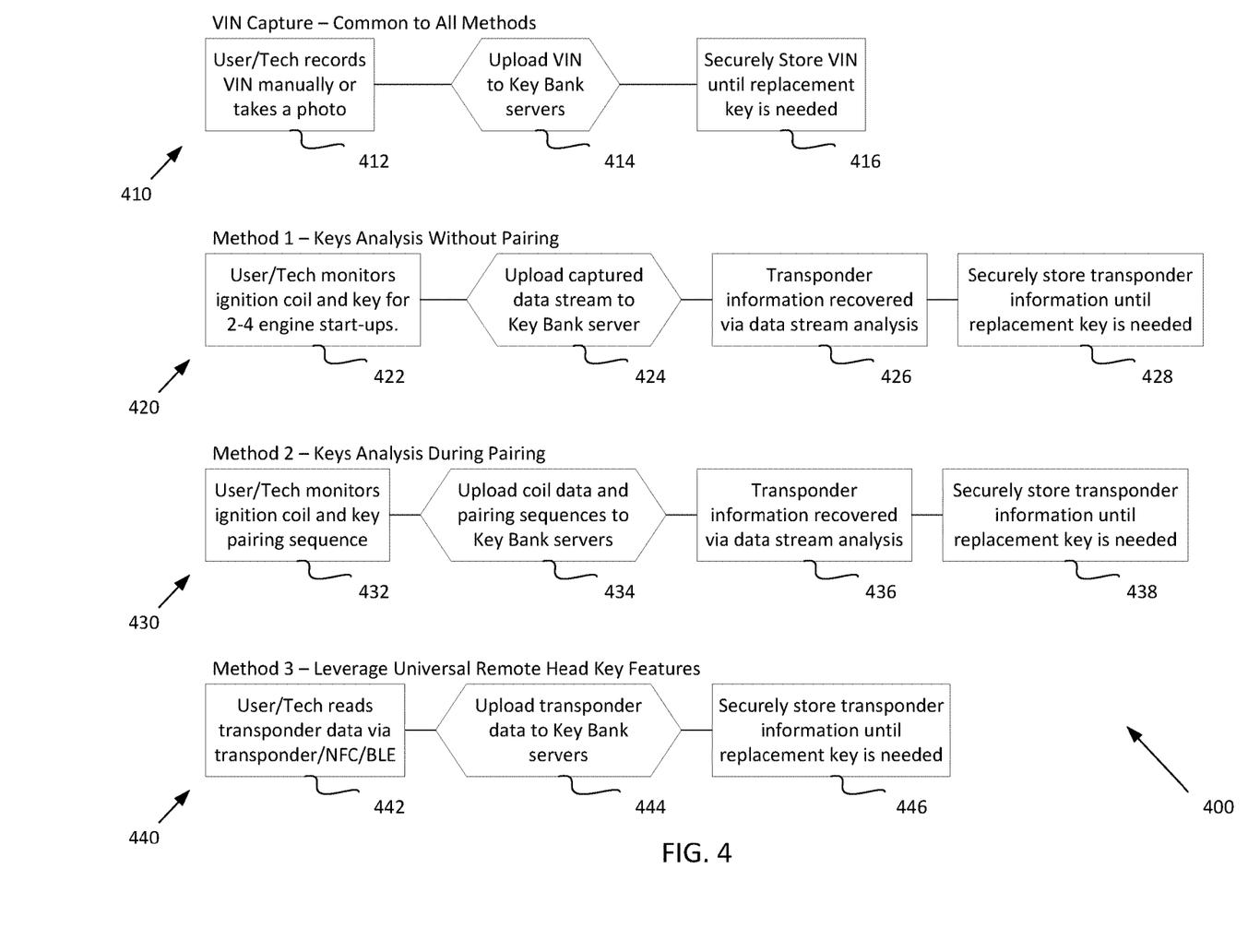
FIG. 4 provides a set of flowcharts illustrating methods that may be used to capture vehicle data according to the present invention.

With reference to FIG. 4, a set of flowcharts 400 illustrating methods that may be used to capture vehicle data according to the present invention are provided. For any type of key enrollment and data capture for the Key Bank service, the VIN capture 410 is performed. In the VIN capture 410 process, a user or technician records the VIN manually or takes a picture of the VIN or VIN barcode on the vehicle at step 412. In step 414, the VIN is securely uploaded or transmitted to the Key Bank servers. The VIN is then encrypted and securely stored at step 416 until a replacement URHK is needed.

The method 420 provides a method for key analysis without requiring the pairing of a master OEM key with the vehicle. First, in step 422 a user or technician monitors the vehicle key, which may be an OEM key or a URHK, and the ignition coil through the use of an ignition coil monitor for 2-4 engine start-ups. The vehicle is started and stopped 2-4 times to capture all the necessary information about the key and vehicle, including transponder information. Next, in step 424 the captured information data stream is uploaded or transmitted to the Key Bank server. The transponder information required to make a replacement key is identified and captured by analyzing the captured data stream in step 426. The transponder information and captured data stream are stored securely in step 428 in the Key Bank server encrypted data store as a set of unique data until a replacement key is required.

The method 430 provides a method for key analysis during the pairing of an OEM key or URHK with the vehicle. First, in step 432 a user or technician monitors the vehicle key, which may be an OEM key or a URHK, and the ignition coil through the use of an ignition coil monitor and monitors vehicle key pairing information through an OBD port monitor connected to a vehicle OBD port. The key is paired with the vehicle and the ignition coil monitor and OBD port monitor capture all information used, transmitted, and received during the pairing process. Next, in step 434 the captured information data stream from the key, the ignition coil monitor and they OBD port is uploaded or transmitted to the Key Bank server. The transponder information required to make a replacement key is identified and captured by analyzing the captured data stream in step 436. The transponder information and captured data stream are stored securely in step 438 in the Key Bank server encrypted data store as a set of unique data until a replacement key is required.

The method 440 provides a method for data capture using features unique to a URHK. The URHK may include features such as NFC and BTLE that enable communication directly with the URHK without requiring the use of ignition coil monitors or OBD port monitors. The URHK may be paired with a device such as a pairing data logger 16, base station 102, mobile device, personal computer, or OBD port communications device to transmit or capture the necessary data. A combination of these devices may be used to capture the data necessary to enroll a URHK vehicle key in the Key Bank service. In step 422 the user or technician reads transponder data directly from the URHK by the URHK transponder, NFC connection, or BTLE connection. In step 444 the data stream including transponder information is uploaded or transmitted to the Key Bank server. The transponder data is encrypted and securely stored in step 446 in the Key Bank encrypted data store until a replacement key is needed.

Using any of the methods described in FIGS. 3 and 4. A unique set of data, customer data, vehicle data, and/or key data is stored in Key Bank servers, enrolling a user or customer's key in the Key Bank service. If the customer ever requires a replacement URHK, this information is used to generate, program and configure, and deliver a replacement key to the user. VIN and OBD port information are used to determine the type of transponder, the encryption protocol that is used, and the demodulation/modulation scheme that is required. The use of the wrong or incorrect secret key or encryption method will cause communications between the vehicle and key to fail.

Figure 5:
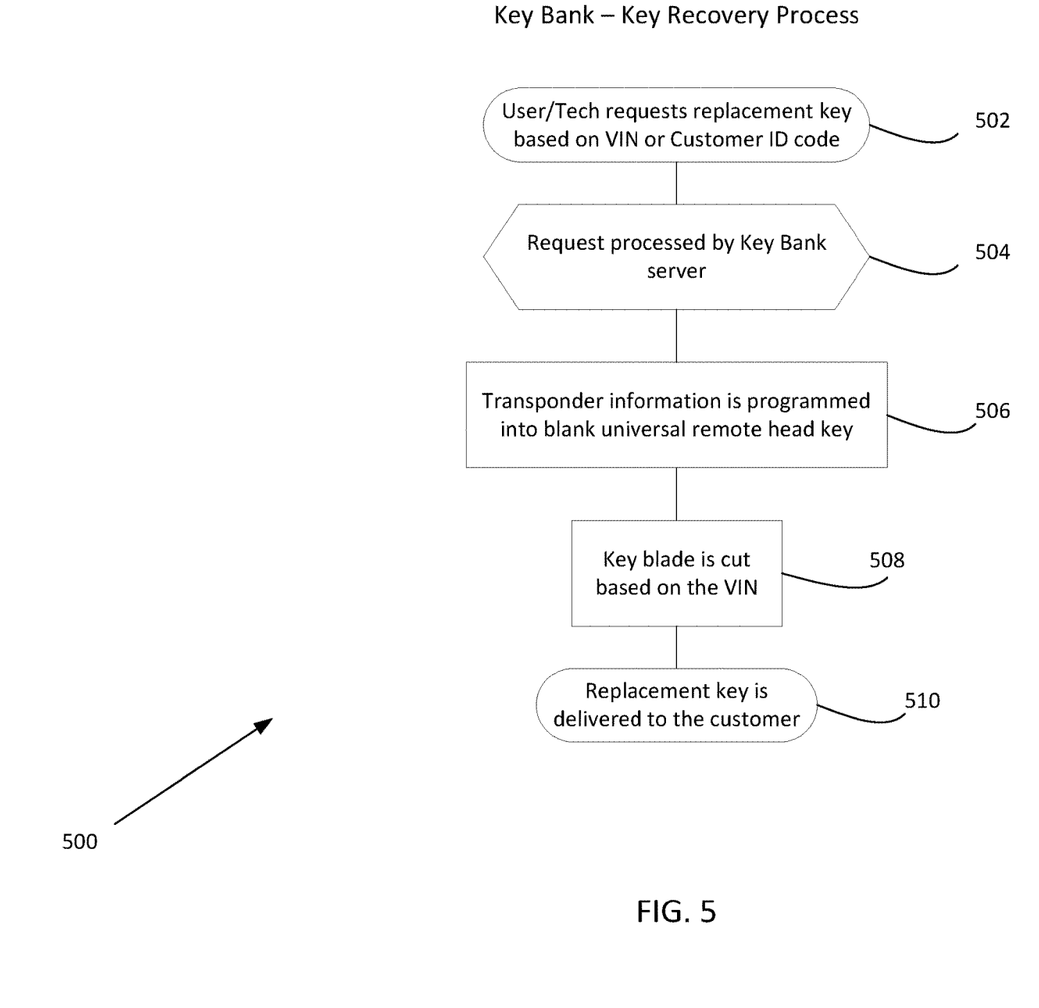
FIG. 5 provides a simplified flowchart of the process of producing a replacement vehicle key according to an embodiment of the present invention.

With reference to FIG. 5, a simplified flowchart 500 of the process of producing a replacement vehicle key according to an embodiment of the present invention is provided. To produce a replacement vehicle key for a key enrolled in the Key Bank service, in step 502 a user or technician first requests a replacement key be sent to them based on a VIN, customer ID code, or using a device to read a unique customer identification card such as an RFID card that has been programmed with the necessary identification information. The request is received and processed in step 504 at the Key Bank server. The received information is verified and checked against the encrypted information stored in the Key Bank encrypted data store. Once verified, in step 506 the unique information, including transponder information, is programmed into a blank URHK. The URHK is configured for the stored VIN, but additional functionality may also be programmed into the URHK based on user preferences. At step 508 a key blade is cut based on stored key blade information that may be obtained based on the VIN. The configured URHK with cut key blade is then delivered to the customer at step 510.

In another embodiment, after the key blade is cut in step 508, or if only a keyfob or RKE device is needed and no key cutting is required, a non-paired keyfob/RKE device/transponder may be sent to the customer in step 510. If a non-paired device is sent to the customer, the customer may be provided with a dongle-based programming tool so that the customer may easily pair the delivered product with the vehicle. Methods and systems for dongle-based key pairing and programming are described in U.S. Provisional Patent Application No. 62/690,326, entitled SYSTEM AND METHOD FOR PAIRING A KEY WITH A VEHICLE VIA A VEHICLE COMMUNICATIONS PORT BY A DONGLE, Johnson et al., filed Jun. 26, 2018, and in U.S. Provisional Patent Application No. 62/703,669, entitled SYSTEM AND METHOD FOR PAIRING A KEY WITH A VEHICLE VIA A VEHICLE COMMUNICATIONS PORT BY A DONGLE, Johnson et al., filed Jul. 26, 2018, both of which are incorporated herein by reference in their entirety.

Figure 6:
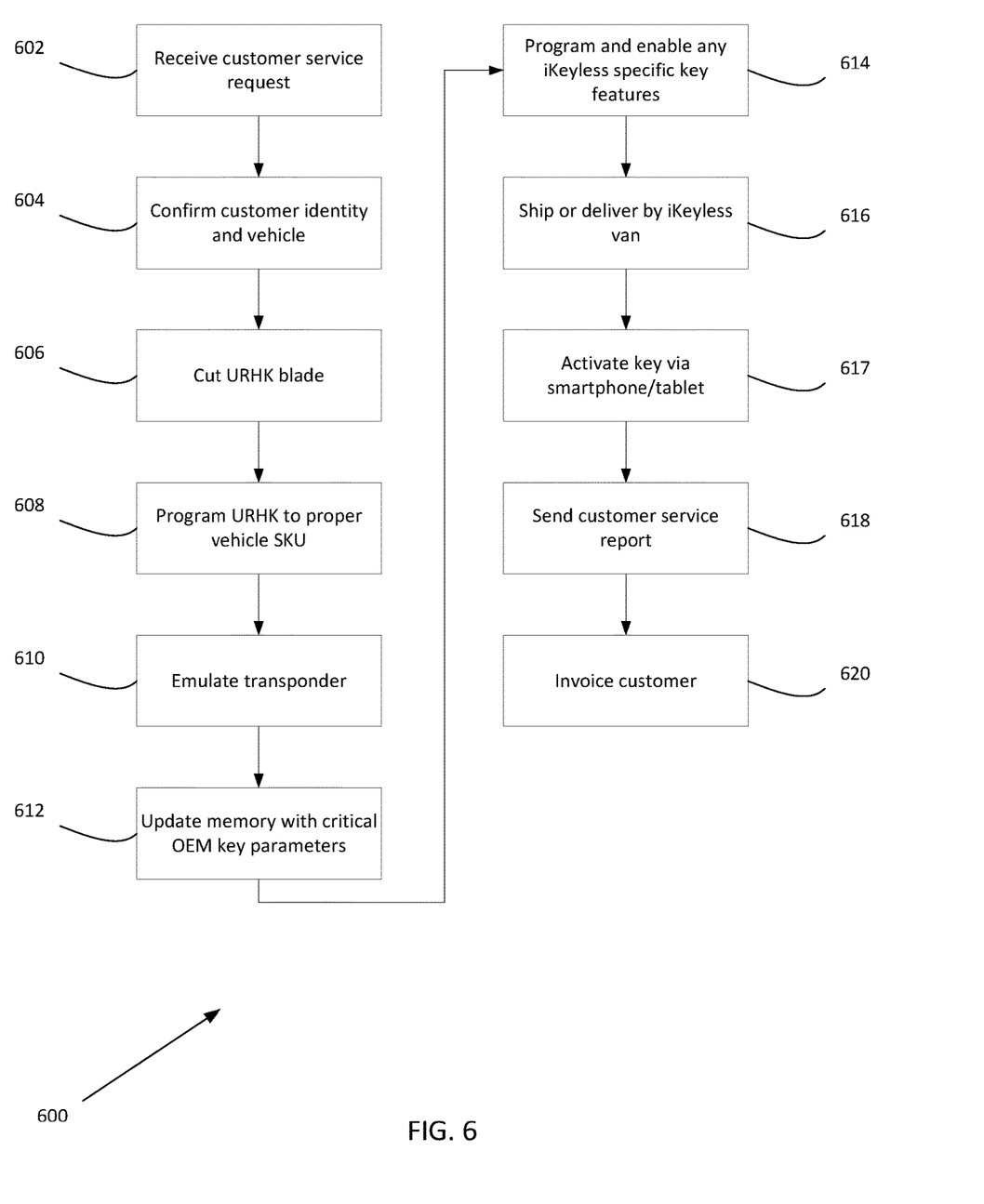
FIG. 6 provides a flowchart of the process of generating a replacement key according to an embodiment of the present invention.

With reference now to FIG. 6, a flowchart 600 of the process of generating a replacement key and delivering the key to the customer according to an embodiment of the present invention is provided. The process for generating a replacement URHK begins at step 602 when a customer service request is received. The customer service request includes customer identification information and vehicle identification information that are verified in step 604. In step 606 the key blade for the URHK is cut based on the vehicle VIN or based on stored key blade information. The URHK is then programmed in step 608 based on the vehicle SKU and based on information stored in the Key Bank server from the enrollment process for the vehicle key. The programmed URHK may then be specifically configured to emulate a transponder in step 610. In some configurations, the URHK may have a specific transponder in the URHK and may not need to emulate a key transponder. The memory in the URHK is updated with critical OEM key parameters such as rolling code information, key press information, and time information in step 612. Then, in step 614, any iKeyless URHK specific key features are programmed and enabled.

The URHK specific features are not available in a typical OEM key. The processing power of the system in the URHK and the memory of the URHK enable features that a standard vehicle head key or remote keyless entry system cannot provide. The additional features may include the ability to disable texting while driving on a paired mobile device; the ability to log driving times and locations using key, vehicle, and/or mobile device data; live GPS tracking; vehicle electrical system validation; engine service requirements and notifications; excessive speed, high engine RPM, and vehicle fault alerts; and the ability to disable the URHK from starting the vehicle on demand or based on a time schedule. Additionally, the URHK may be configured to provide for the upload of key and vehicle information to the Key Bank service and Key Bank servers as a backup system. These features may be dynamically uploaded to the URHK on a weekly/monthly basis as new features and services become available. The additional features may also be activated by a customer using a mobile device or application at a later time, or by a user or technician based on a subscription service. The URHK also enables a dealer or locksmith to select a desired vehicle or remote SKU via an application or specialized programming device and "bulk program" URHKs for use with a particular type, make, or model of vehicle. This feature may be especially useful for dealer or fleet vehicle key replacements.

In another embodiment, the vehicle data may be gathered by applying temporarily, to an original electronic key to be duplicated, an inductive reader for signals exchanged between a transponder of an original electronic key and a vehicle immobilizer control unit (e.g., BCM/ECU). The process may involve activating a vehicle instrument panel at least twice with the original electronic key connected to the inductive reader, to cause the inductive reader to acquire a first set of random numbers and a second set of random codes transmitted by the immobilizer control unit during the two activation steps of the vehicle instrument panel. After the random numbers and codes have been obtained, the inductive reader is connected to a transponder reader/writer to transfer all acquired data to the reader/writer, e.g., the base station controller. Then a non-readable code of the immobilizer control unit is determined by the reader/writer by using a function $f^{-1}$ inverse to that a function which creates a random code value from a unique vehicle identification number, a random number from the first set of random numbers, and the second set of random codes and by using the acquired data. After the non-readable code is determined it is used to read from the original key, via the reader/writer, any other data memorized therein. Next a unique ID value is read selected from among the unique vehicle identification number, the first set of random numbers, and the second set of random code values from the original key, via said reader/writer, before, during or after any one of the preceding steps and then memorizing in a new key all data read from the original key.

The method uses a traditional transponder reader/writer provided with a display screen for displaying the operations to be carried out, a slot for inserting an original key to be read or a new key to be encoded, a seat for inserting an inductive reader and pushbuttons for controlling, in accordance with the operations displayed on the screen, the operations involved in reading from and writing to the key inserted into the slot in the reader/writer. The inductive reader comprises an electronic circuit housed in a parallelepiped casing, a pair of LEDs or other light and/or acoustic indicating means, and a wire antenna. The parallelepiped casing houses a microcontroller for controlling the entire operating cycle, a memory in which the data captured by the antenna can be stored, and an electric battery. The most significant data which intervene in a traditional process of mutual recognition between an electronic key and the control unit of a vehicle immobilizer includes: ID defines the identification number of the original key; SK defines the non-readable code of the original key and of the control unit; RND defines the random number generated by the immobilizer control unit when it recognizes the ID code of the key inserted into the vehicle ignition switch; SIG defines a function f calculated by a certain algorithm on the basis of the AD, SK and RND codes, i.e. SIG=f(ID, SK, RND); and RESPONSE defines the response of the recognized key, which after being recognized by the immobilizer control unit has itself recognized the control unit. The first operation consists of physically connecting the inductive reader temporarily in some manner to the original key, to maintain it coupled thereto during its use for at least two activation stages, i.e. when the key is inserted into the vehicle ignition switch. After two activation operations, which can take place during normal use of the original key, the inductive reader, which is present at the data exchange between said original key and the vehicle immobilizer control unit, receives and writes into its memory the ID code transmitted by the original key together with two numbers RND1 and RND2 and two codes SIG1 and SIG2 transmitted by the immobilizer control unit. For reasons of operational certainty, after the first acquisition the LED flashes, then after the second acquisition the LED remains continuously lit and the LED flashes to indicate completion of the acquisition stage. The inductive reader can then be separated from the original key and is connected to the transponder reader/writer, generally positioned in the shop or in the duplication center, and generally distant from the vehicle. Following this connection, which essentially involves the wire antenna of the inductive reader and the internal antenna of the reader/writer, the calculation process takes place therein, which from a knowledge of the ID, the two RDN1 and RDN2 values and the two SIG1 and SIG2 values, and using the inverse function f−1, enables the non-readable SK code of the control unit to be obtained, which is equal to that of the original key. When in possession of this SK value, the transponder reader/writer is able to write from the original key, previously inserted into its slot, all the data contained in its memory. After the original key has been removed from the slot of the reader/writer and the new key to be encoded inserted in its place, the transponder reader/writer is able to write into the memory of this latter all the data read from the original key. The sequence of the various operations involved in reading from the original key and writing to the new key can be executed as an automatic sequence or by stepwise control executed by operating the pushbuttons of the reader/writer. If the new key is to be encoded not only in its electronic characteristics but also in its mechanical characteristics, the mechanical notching can be carried out in traditional manner at any moment, before, during or after electronic encoding, as the two operations can be independent of each other. In particular, this mechanical notching is preferably carried out on termination of the electronic encoding, i.e. when the generally more critical operation has been successful. In order to prevent any previous memorizations in the inductive reader originating from previous duplication processes from being able to result in mistakes or uncertainties in the duplication operation underway, the inductive reader is preferably connected to the transponder reader/writer before each duplication, in order to be reset. Additional steps and elements are disclosed in U.S. Pat. No. 8,451,099, METHOD FOR DUPLICATING ELECTRONIC VEHICLE KEYS WITH MUTUAL AUTHENTICATION, Dondadini, issued May 28, 2013, which is incorporated by reference herein in its entirety.

In another embodiment, the present invention provides a method for the duplication of original electronic keys used in the automotive transports, and provided with coded and encrypted electronic authentication means, comprising: an Identification Code (ID), an encrypted secret code, a Password, an algorithm, data storage and computing means, able of being used in vehicles provided with a central processing unit able of storing an Identification Code (ID), an encrypted secret code, a Password, an algorithm, said duplication method being able of obtaining a duplicated key based on a blank key, which is originally provided with an algorithm, data storage means able of storing said Identification Code (ID), said secret code and said Password, wherein said data storage means are initially empty; said duplication is based on a duplication means and on a method which allows of using the blank key as intercepting means of secret codes sent by the vehicle central processing unit, and of transferring said information to the duplication means itself. The invention comprises a method of duplicating a motor vehicle electronic key, comprising: transmitting to the motor vehicle electronic key, by a first device, an encrypted secret code; receiving, by the motor vehicle electronic key, the encrypted secret code; as the electronic key is receiving the secret code which has been encrypted, intercepting the transmission to the motor vehicle electronic key by the first device, comprising the encrypted secret code, and storing, by a second device different from the first device and different from the motor vehicle electronic key, the encrypted secret code, which is extracted from the transmission; interrogating the motor vehicle electronic key, by a duplicator device which is different from the first device and different from the motor vehicle electronic key, using the encrypted secret code which has been intercepted and stored; receiving, by the duplicator device from the motor vehicle electronic key, a password transmitted from the motor vehicle electronic key in response to the interrogating; storing, by the duplicator device, the password transmitted from the motor vehicle electronic key; transmitting, by the duplicator device, the password to a blank key; and storing the password in the blank key. Additional steps and elements are disclosed in U.S. Pat. No. 8,750,510, entitled DUPLICATION MEANS FOR AN ELECTRONICALLY CODED KEY AND RELATED METHOD, Rebuli, issued Jun. 10, 2014, which is incorporated by reference herein in its entirety.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method for capturing from a vehicle under test and storing vehicle key information used for replacing vehicle keys, the method comprising:
   connecting an on-board diagnostic ("OBD") port monitor to an OBD port of a vehicle and connecting an ignition coil monitor on an ignition coil of the vehicle;
   starting and stopping the vehicle a pre-determined number of times using an original equipment manufacturer ("OEM") key that was previously paired with the vehicle;
   capturing a set of vehicle information associated with the vehicle and a set of key information associated with the OEM key in part by monitoring the OBD port by the OBD port monitor and monitoring the ignition coil by the ignition coil monitor from a vehicle under test;
   analyzing the set of vehicle information and the set of key information to identify a set of unique information associated with the vehicle and the OEM key; and
   storing the set of unique information, the set of vehicle information, and the set of key information collected from the vehicle under test in an encrypted data store.

2. The method of claim 1, further comprising:
   pairing a replacement key with the vehicle;
   capturing a set of pairing information associated with the pairing of the replacement key with the vehicle by the OBD port monitor and the ignition coil monitor;
   analyzing the set of pairing information to identify the set of unique information; and
   storing the set of pairing information in the encrypted data store.

3. The method of claim 1, wherein the set of unique information comprises transponder information.

4. The method of claim 1, further comprising transmitting the set of vehicle information and the set of key information to a remote server for analysis.

5. The method of claim 1, further comprising capturing a set of OBD transaction information by the OBD port monitor.

6. The method of claim 5, wherein the analyzing further comprises analyzing the set of OBD transaction information to identify the set of unique information.

7. The method of claim 1, further comprising:
   capturing a set of owner information associated with an owner of the vehicle;

associating the set of owner information with the set of vehicle information, the set of key information, and the set of unique information; and storing the set of owner information in the encrypted data store.

8. The method of claim 7, further comprising programming a unique identification card with the set of owner information and the set of unique information.

9. The method of claim 7, further comprising:
receiving and processing a request for a replacement key from an owner associated with the set of unique information;
programming and configuring the replacement key based on the set of unique information stored in the encrypted data store; and
sending the replacement key to the owner, the replacement key requiring no additional pairing processes to function with the vehicle.

10. The method of claim 8, wherein the programming and configuring further comprises:
cutting a key blade of the replacement key based on the set of key information;
programming the replacement key based in part on a vehicle identification code;
emulating, in the replacement key, a transponder of the vehicle based on the set of unique information;
updating a memory in the replacement key based on a set of unique parameters associated with the vehicle and the OEM key; and
programming a set of additional features in the replacement key.

11. The method of claim 9, further comprising activating the replacement key with a mobile device.

12. The method of claim 1, wherein the capturing the set of vehicle information further comprises capturing a vehicle identification number ("VIN").

13. A system for capturing and storing vehicle key information from a vehicle under test for programming and configuring replacement vehicle keys, the system comprising:
a server having a processor and a memory and comprising an encrypted data storage;
an on-board diagnostic ("OBD") port monitor adapted to be removably connected to a vehicle OBD port;
an ignition coil monitor comprising a loop sensor adapted to be positioned proximate a vehicle ignition coil of a vehicle under test;
a base station in communication with the ignition coil monitor and the OBD port monitor;
the base station adapted to monitor and capture, by the OBD port monitor and the ignition coil monitor, communications signals between a vehicle key comprising a transponder, a remote keyless entry system having a processor and a memory, and a key blade, and a vehicle comprising a remote keyless entry system, an engine control unit ("ECU"), an ignition coil, and OBD port connected to the ECU;
wherein the communications signals are generated when the vehicle key is operated to cause the vehicle to perform a function;
the base station further adapted to transmit to the server the captured communications signals; and
the server adapted to identify a set of unique information based on the set of captured communications, and to store the set of unique information in the encrypted data store.

14. The system of claim 13, wherein the system further comprises:
a key configuration device;
the server further configured to transmit to the key configuration device the set of unique information based on a received replacement key request; and
the key configuration device adapted to receive the set of unique information from the server and configure a replacement key based on the set of unique information.

15. The system of claim 13, wherein the OBD port monitor is connected to the vehicle OBD port and the ignition coil monitor is connected to the vehicle ignition coil.

16. The system of claim 15, wherein the communication signals comprise:
a first data stream comprising information obtained by monitoring a first set of communications between the transponder of the key and the ignition coil by the ignition coil monitor; and
a second data stream comprising information obtained by monitoring a set of ECU information in the vehicle ECU by the OBD port monitor.

17. The system of claim 13, further comprising a card programmer adapted to program a unique identification card with the set of unique information and an associated set of owner information.

18. The system of claim 14, wherein the server is further adapted to receive an activation signal from a mobile device and transmit to the mobile device an authentication signal, the authentication signal adapted to enable functionality on the replacement key.

19. The system of claim 18, further comprising an OBD dongle adapted to connect to the vehicle OBD port, receive the authentication signal from the mobile device, and update the replacement key based in part on the activation signal and a set of updated vehicle information.

20. A method for capturing and storing vehicle key information used for replacing vehicle keys, the method comprising:
applying temporarily, to an OEM electronic key to be duplicated, an inductive reader for signals exchanged between a transponder of an original electronic key and a vehicle immobilizer control unit;
activating a vehicle instrument panel at least twice with the OEM electronic key connected to the inductive reader, to cause the inductive reader to acquire a first set of random numbers and a second set of random codes transmitted by the immobilizer control unit during the two activation steps of the vehicle instrument panel;
connecting the inductive reader to a transponder reader/writer to transfer all acquired data to the reader/writer;
determining a non-readable code of the immobilizer control unit by the reader/writer by using a function $f^{-1}$ inverse to a function which creates a random code value from a unique vehicle identification number, a random number from the first set of random numbers, and the second set of random codes and by using the acquired data;
reading from the original key, via the reader/writer, using the non-readable code any other data memorized therein;
selecting a unique ID value from among the unique vehicle identification number, the first set of random numbers, and the second set of random code values from the original key, via said reader/writer, before, during or after any one of the preceding steps and then memorizing in a new key all data read from the original key;
analyzing the acquired data, the first set of random numbers, the second set of random codes, the unique vehicle identification number, and the unique ID value to identify a set of unique information associated with the vehicle and the OEM key; and
storing the set of unique information, the acquired data, the first set of random numbers, the second set of random codes, the unique vehicle identification number, and the unique ID value in an encrypted data store.

21. A method for capturing and storing vehicle key information used for replacing vehicle keys, the method comprising:
transmitting to a motor vehicle electronic key, by a first device, an encrypted secret code;
receiving, by the motor vehicle electronic key, the encrypted secret code;
as the electronic key is receiving the secret code which has been encrypted, intercepting the transmission to the motor vehicle electronic key by the first device, comprising the encrypted secret code, and storing, by a second device different from the first device and different from the motor vehicle electronic key, the encrypted secret code, which is extracted from the transmission;
interrogating the motor vehicle electronic key, by a duplicator device which is different from the first device and different from the motor vehicle electronic key, using the encrypted secret code which has been intercepted and stored;
receiving, by the duplicator device from the motor vehicle electronic key, a password transmitted from the motor vehicle electronic key in response to the interrogating;
storing, by the duplicator device, the password transmitted from the motor vehicle electronic key;
transmitting, by the duplicator device, the password to a blank key;
storing the password in the blank key;
analyzing the encrypted secret code, the transmission, and a set of vehicle information associated with a motor vehicle to identify a set of unique information associated with the motor vehicle and the electronic key; and
storing the set of unique information, the encrypted secret code, the transmission, and the set of vehicle information in an encrypted data store.

* * * * *